United States Patent Office 3,490,912
Patented Jan. 20, 1970

3,490,912
PELLETED RUMINANT FEEDSTUFF
Thomas E. Freese, Indianapolis, Ind., assignor to Allied Chemical Corporation, New York, N.Y., a corporation of New York
No Drawing. Continuation-in-part of application Ser. No. 510,936, Dec. 1, 1965. This application Mar. 28, 1969, Ser. No. 811,625
Int. Cl. A23k 1/02
U.S. Cl. 99—6                                         1 Claim

ABSTRACT OF THE DISCLOSURE

A solution of urea is admixed with a solid absorbent feedstuff and the mixture is dried to deposit solid urea into the interstices of the feedstuff. The urea-containing feedstuff is then pelleted with other ruminant feed ingredients to provide feed pellets of excellent storage properties.

---

This application is a continuation-in-part of my co-pending application Ser. No. 510,936, filed Dec. 1, 1965 and now abandoned.

It is well known that ruminant animals have the unique ability of utilizing non-protein-nitrogenous compounds. This is accomplished by the symbiotic relationship between microorganisms which multiply in the rumen and reticulum of ruminant animals which actually utilize the non-protein-nitrogen and convert it into organismal protein which can in turn be digested and absorbed by the animal. For some thirty years, it has been known that a portion of the protein requirements of ruminants can be supplied by urea. The rumen micro-flora convert the urea nitrogen into protein utilizable by the ruminants. The substitution of urea for part of the more expensive natural protein feedstuffs makes possible savings in the formulation of ruminant feeds. However, the incorporation of the hygroscopic urea in feeds leads to mixes and finished pellets having poor storage characteristics. Often it is difficult to remove such products from bulk bins because of caking and resulting bin sets. It is known that the caking tendency can be somewhat reduced by additional drying of the feed and/or by adding conditioning agents such as clays to the finished products. However, these methods often are expensive and frequently result in dusty products. Replacement of urea by its less hygroscopic, but more costly, autocondensation products has proven to be economically unattractive and nutritionally unsound in some formulations. There is therefore a continued need for improvement in such formulations when urea is employed.

It is an object of this invention to provide a process for the production of feedstuffs containing urea that have reduced caking tendency and bin set.

It is another object of this invention to provide a process for the production of pelleted urea-containing feedstuffs whereby the pelleting rate is substantially increased.

These and other objects will be obvious from the description of the invention that follows.

Briefly stated, the objects of this invention are accomplished by combining nitrogen from a liquid form of urea with an absorbent feedstuff to produce a different physical form of nonprotein nitrogen. The urea is preferably applied to the absorbent feedstuff as a concentrated aqueous solution. Up to about 2 parts of urea per part of absorbent feedstuff may be used. The water is evaporated while the mixture is tumbled to prevent agglomerization. The resulting dry, free flowing product, which comprises an adsorbent feedstuff containing solid urea adsorbed in its interstices, is then mixed with other ruminant feed ingredients and compressed into pellets by conventional means.

We have found that when the urea-impregnated feedstuffs are added to ruminant feed formulations, conventional and well known in the art, and pelleted, finished pellets result that have excellent storage properties when compared to the poor storage properties normally encountered on incorporating urea into these compositions. Moreover, the urea-impregnated material appears to provide lubrication and significantly increases pellet production rates. This improvement in the pelleting rate is particularly unexpected. While the mechanism by which the pelleting rate is increased is not known with certainty, it is suggested that it may be that pelleting of known mixtures of urea-containing feedstuffs is difficult because the relatively large particles or urea normally used interfere with passage of the feed mixture through the pelleting dies. Such particles of urea are not fount in the present product since the urea is adsorbed in the interstices of the adsorbent feedstuffs and the pelleting proceeds as if no urea were being used. The new physical form of urea also slows the rate at which urea dissolves in the rumen fluid and thereby increased utilization of the urea.

In addition to forming an improved pelleted ruminant feed, other practical uses for urea-impregnated feedstuff are as follows:

(1) As the foundation for a synthetic protein meal to be fed to ruminant classes of livestock.

(2) As a substitute for feed grade urea.

(3) As the base ingredient for a corn silage fortifier.

(4) As a protein extender to be combined with one or more of the commonly used vegetable proteins for ruminant animals.

(5) For use in some foreign countries where regular sources of protein are scarce or unavailable.

(6) To upgrade the nutritional value of soybean hulls which are presently sold as a bulk additive for feed formulations.

(7) As a base for preparing a high level protein pre-mix formulation.

The urea impregnated absorbent feedstuffs may be incorporated in any of conventional feedstuffs known to those skilled in the art. For illustrative purposes herein, we prefer to substitute urea-impregnated feedstuff in the well known "Purdue 64" supplement which contains 280 pounds cane molasses, 1,020 pounds dehydrated alfalfa, 422 pounds urea, 208 pounds bone meal and 70 pounds salt. This formulation is very difficult to pellet and cannot be satisfactorily produced in hard pellet manufacturing equipment. An additional problem presented by this formulation is the condition of the bulk pellets which are normally extremely tacky and have an excessive amount of bin set.

The preferred practice of the invention will be discussed in terms of urea impregnation of dehydrated alfalfa, which is readily available, relatively low in cost, and has a high protein value of 17%, and the benefits obtained when this material is incorporated in "Purdue 64."

It is generally accepted that non-protein nitrogen such as urea is best used in conjunction with protein nitrogen for best results in ruminant feeding. While dehydrated alfalfa is the preferred absorbent feedstuff as indicated above, other absorbent feedstuffs may also be used to advantage in this invention. The following table lists other appropriate feedstuffs together with their protein values.

| Name: | Nominal protein value |
|---|---|
| Dried beet pulp | 8.66 |
| Dried molasses beet pulp | 10.83 |
| Dried potato pulp | 7.78 |
| Dried citrus pulp | 6.68 |
| Dried brewers' grains | 33.21 |
| Corn distillers' dried grains | 28.33 |
| Oat mill feed | 3.58 |
| Corn cob meal | 2.32 |
| Soy mill feed (heat treated) | 11.0 |

In the preferred practice of this invention, an aqueous solution of urea containing 50–70% urea is sprayed onto ground dehydrated alfalfa while the alfalfa is tumbled or mixed in suitable equipment such as a chip blender. The alfalfa and the urea solution are preferably heated to a sufficiently high temperature to maintain the urea in aqueous solution during the spraying and mixing operation; a temperature in the range 25–100° C. is normally used depending on the concentration of the urea solution. Spraying is continued until the mass contains 0.1–2 parts of urea per part of dried alfalfa, on a weight basis. The damp mass is dried at a temperature below about 105° C. A gas fired drier is suitable equipment for the drying operation. Product temperature in the drier should not exceed about 105° C. and is normally maintained in the range 90–105° C. during drying. Excessive drying temperatures may decompose part of the protein in the alfalfa. The impregnated absorbent is dried sufficiently to remove the water which was incorporated therein during admixture with the urea solution, i.e., it is reduced to a dry, free-flowing material containing water at a level about equal to the water level in the initial absorbent ground feedstuff. Typically, the dried impregnated absorbent will contain not less than about 8% and not more than about 12% water.

The thus prepared and dried urea-impregnated alfalfa is blended with moist natural ruminant feeds and the mixture is heated to about 40° C. or above to facilitate pelleting. The blend is preferably heated to a temperature within the range of about 40–60° C., whereby the solid urea becomes more soluble in the water which is retained by the dried impregnated absorbent. Thus, the liquid phase of the material to be pelleted increases from at least about 8% to at least about 21% by weight of the dried impregnated absorbent, thereby permitting increased pelleting rate. While maintaining its temperature at least about 40° C., the ruminant feed mixture is extruded through a die and broken into pellets. The amount of urea in the overall formulation varies with the need for protein supplementation and may range from 2–30% of the total feed. Up to about 10% of the total urea may be added in the form of pelleted urea; however, practically all of the urea should be present as urea-impregnated feedstuff to obtain nontacky pellets and low bin set.

Pelleting may be effected by any of conventional methods employing known hard pelleting equipment and pellets of various sizes, as desired, may be formed. In general, pellets ranging in size from 1/16" diameter to 1" diameter are employed.

The following examples are given for the purpose of further illustrating this invention.

The following example demonstrates preparation of dry-urea impregnated alfalfa containing 13.5% total nitrogen equivalent to 84.2% crude protein.

EXAMPLE 1

A solution of 75 pounds urea in 75 pounds water at room temperature (25° C.) was sprayed onto 225 pounds of ground dehydrated alfalfa containing about 10% water, about 17.0% crude protein, about 4.5% crude fat, and about 27% crude fiber. The spraying operation was accomplished in a chip blender, wherein the alfalfa mixture was constantly agitated. The moist product contained about 26% water but was essentially free-flowing. The above spraying operation was repeated to obtain 4 similar batches. Thus, a total of 300 pounds of urea, as 50% aqueous solution, was sprayed onto 900 pounds of dehydrated alfalfa. The combined moist product was dried to 8% water content by passing the product twice through an 8-inch by 12-inch rotary, gas fired drier, suitably controlled to give a product temperature no higher than 105° C. The dried product contained 13.5% total nitrogen (equivalent to 84.2% equivalent crude protein). Product was stored until its use was desired. No caking or formation of lumps occurred in the material during a storage period of approximately three weeks in fiber drums.

The following example demonstrates use of urea-impregnated alfalfa to prepare a desirable pelleted ruminant feed supplement. The formula in which the urea-impregnated alfalfa was substituted is "Purdue 64" supplement which contains 280 pounds cane molasses, 1,020 pounds dehydrated alfalfa, 422 pounds urea, 208 pounds bone meal and 70 pounds salt.

EXAMPLE II

About 702 pounds of the urea-impregnated alfalfa prepared as described in Example 1 and 19 pounds of crystal-line feed grade urea (containing 42% N) were added to 104 pounds bone meal and 35 pounds iodized salt. After mixing the 860-pound batch in a mixer, 140 pounds molasses were metered in the mix and steam was introduced to raise the temperature of the soft mash to about 40° C. The mash was pelleted using a Sprout-Waldron pellet machine fitted with a 12/64-inch die. The pellets were cooled to ambient temperature in a horizontal conveying-screen cooler prior to storage in a bulk bin. The finished pellets contained 64% total crude protein equivalent, and 12% moisture.

The formula pelleted easily with an improvement in pellet machine production rate as compared with normal production. Specifically, the production rate was 6 tons per hour in the Sprout-Waldron pellet machine rated at 2–10 tons capacity. Power requirement was normal with less fines than normal. Pellet temperature exiting the die was 58° C. and temperature after 12 minutes in cooler was 31° C. Pellets showed no signs of bin set and were rated as good and fairly dry exiting the cooler.

The following example was carried out for comparative purposes to show the benefit of operating in accordance with Example II.

EXAMPLE III

A feed formulation equivalent to the feed formulation of Example II was made up except that 510 pounds dehydrated alfalfa and 211 pounds feed grade urea was used rather than the 84% crude protein urea-impregnated alfalfa. (This is the "Purdue 64 formulation.") The mix was pelleted and cooled as described above. The 1000-pound batch was pelleted in 6 minutes, a rate of 5 tons per hour. The pellets exiting the coller were at 27.5° C. and contained 64% crude protein equivalent, and 12% moisture. These pellets were relatively tacky, shorter, softer and therefore less desirable than the pellets containing the urea-impregnated alfalfa. After storage for 4 days the product was compared for bin set with the product of Example II which had been stored for the same period. The pellets made with the urea-impregnated alfalfa showed surprisingly little bin set while the product made in Example III showed hard bin set.

The foregoing examples illustrate that substitution of urea-impregnated alfalfa in feed mixture supplements substantially overcomes the bin set problem, produces formulations as hard pellets and increases the rate of pellet formation. Unexpectedly, the instant process provides these advantages in the preparation of urea-supplemented ruminant feed-stuffs. However, when this process is utilized with other supplements, biuret for example, these same advantages are not obtained.

Various modifications of the details and examples set forth hereinabove will become apparent to those skilled in the art and may be resorted to without departing from the scope and spirit of the invention.

I claim:
1. A process for preparing at an increased pelleting rate a pelleted urea-containing ruminant feed which is non-tacky and shows essentially no bin set when stored, which process comprises:
- (a) admixing a liquid solution of urea and a solid absorbent ground feedstuff to impregnate the solid absorbent with 0.1–2 parts urea per part absorbent;
- (b) drying said impregnated absorbent at a temperature within the range of about 90–105° C. to obtain a free-flowing dried impregnated absorbent containing at least about 8% water and solid urea deposited in the interstices thereof;
- (c) blending said dried impregnated absorbent with a natural ruminant feed;
- (d) heating the resulting blend to a temperature within the range of about 40–60° C. to increase the liquid phase thereof to at least about 21% by weight of the dried impregnated absorbent;
- (e) pelleting said heated blend while maintaining the temperature thereof at least about 40° C.; and
- (f) cooling the pelleted product to ambient temperature to form hard pellets.

References Cited

UNITED STATES PATENTS 2,861,886    11/1958    Colby et al. _____ 99—2

A. LOUIS MONACELL, Primary Examiner

J. M. HUNTER, Assistant Examiner

U.S. Cl. X.R.

99—2